United States Patent
Lockaby

(10) Patent No.: US 11,807,526 B1
(45) Date of Patent: Nov. 7, 2023

(54) OZONE REPLENISHMENT SYSTEM

(71) Applicant: Bruce Lockaby, Amelia, OH (US)

(72) Inventor: Bruce Lockaby, Amelia, OH (US)

(*) Notice: Subject to any disclaimer, the term of this patent is extended or adjusted under 35 U.S.C. 154(b) by 71 days.

(21) Appl. No.: 17/484,030

(22) Filed: Sep. 24, 2021

(51) Int. Cl.
*C01B 13/11* (2006.01)

(52) U.S. Cl.
CPC .......... *C01B 13/11* (2013.01); *C01B 2201/20* (2013.01); *C01B 2201/50* (2013.01); *C01B 2201/64* (2013.01); *C01B 2201/82* (2013.01)

(58) Field of Classification Search
CPC ..... C01B 13/10; C01B 13/11; C01B 2201/20; C01B 2201/22; C01B 2201/24; C01B 2201/62; C01B 2201/64; C01B 2201/82; C01B 2201/84; C01B 2201/72; C01B 2201/74; C01B 2201/76; C01B 13/115; C01B 2201/14; C01B 2201/10; C01B 2201/90; C01B 2201/50
See application file for complete search history.

(56) References Cited

U.S. PATENT DOCUMENTS

| | | | |
|---|---|---|---|
| 5,547,644 A * | 8/1996 | Taylor | B01J 19/088 422/906 |
| 7,314,600 B2 | 1/2008 | Matsuzaki | |
| 8,152,142 B2 * | 4/2012 | Hirakui | C02F 1/78 261/84 |
| 10,745,277 B2 | 8/2020 | Ono | |
| 2001/0052502 A1 * | 12/2001 | Gargas | C02F 1/78 210/748.2 |
| 2002/0060190 A1 * | 5/2002 | Conrad | C01B 13/11 210/748.19 |
| 2004/0173542 A1 * | 9/2004 | Porat | E04H 4/1272 210/192 |
| 2005/0269254 A1 * | 12/2005 | Roitman | B01D 53/86 210/252 |
| 2006/0151896 A1 * | 7/2006 | Wang | B01F 35/221422 261/DIG. 42 |
| 2006/0261349 A1 * | 11/2006 | Doering | C25B 11/073 257/77 |
| 2009/0114605 A1 * | 5/2009 | Salama | C25B 9/00 210/748.19 |
| 2014/0008211 A1 * | 1/2014 | Dempster | C01B 13/115 422/108 |

FOREIGN PATENT DOCUMENTS

| | | | | |
|---|---|---|---|---|
| JP | 2007021427 A | * | 2/2007 | |
| WO | WO-2021105727 A1 | * | 6/2021 | ............... C25B 1/04 |

* cited by examiner

Primary Examiner — Joshua L Allen

(74) Attorney, Agent, or Firm — SANCHELIMA & ASSOCIATES, P.A.; Christian Sanchelima; Jesus Sanchelima

(57) ABSTRACT

An ozone replenishment system including a housing assembly, an electrolysis assembly, a power assembly, and an ozone assembly is disclosed herein. The housing assembly includes a hollow tower. The power assembly includes a battery. The electrolysis assembly includes a reservoir filled with an electrolyte. The electrolysis assembly also includes an anode electrode a cathode electrode disposed into the reservoir. The anode electrode and the cathode electrode are connected to the battery. The electrolysis assembly produces oxygen and dihydrogen. The oxygen is captured by the hollow tower. The ozone assembly includes a fan that allows the oxygen to cross the hollow tower. The ozone assembly further includes a plurality of ultraviolet lights to convert the oxygen into ozone. The ozone is replenishment into the atmosphere.

7 Claims, 4 Drawing Sheets

OZONE REPLENISHMENT SYSTEM

1. FIELD OF THE INVENTION

The present invention relates to an ozone replenishment system and, more particularly, to an ozone replenishment system that is housed within a tower mounted on top of a water reservoir, and powered by solar panels and a backup e-battery. Water molecules are split into hydrogen and oxygen gas by electrolysis and oxygen gas is converted to ozone via UV lights.

2. DESCRIPTION OF THE RELATED ART

Several designs for ozone generation systems have been designed in the past. None of them, however, include an ozone generation system powered by a renewable power source such as solar panels, UV light such as LEDs to convert oxygen gas to ozone.

Applicant believes that a related reference corresponds to U.S. Pat. No. 7,314,600 issued for an apparatus and method for generating ozone. Applicant believes that another related reference corresponds to U.S. Pat. No. 10,745,277 issued for an ozone generator. None of these references, however, teach of an ozone replenish system having a tower mounted on top of a water reservoir, powered by solar panels and a backup e-battery. Water molecules are split into hydrogen and oxygen gas via electrolysis. Oxygen gas is pushed up and UV lights aimed towards the oxygen gas convert said oxygen gas into ozone and ozone is released via ventilation holes placed under a weather protective roof.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an ozone replenish system that is power by a renewable power source such as solar panels and a back e-battery to store excess power to use when solar panels are not capable of providing power to the system.

It is another object of this invention to provide an ozone replenish system that uses a water reservoir as the source to obtain oxygen gas to be converted to ozone when UV lights strike the molecules of oxygen gas.

It is still another object of the present invention to provide an ozone replenish system that has a storage compartment for the hydrogen gas and a diaphragm within the water reservoir to separate hydrogen and oxygen gas.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
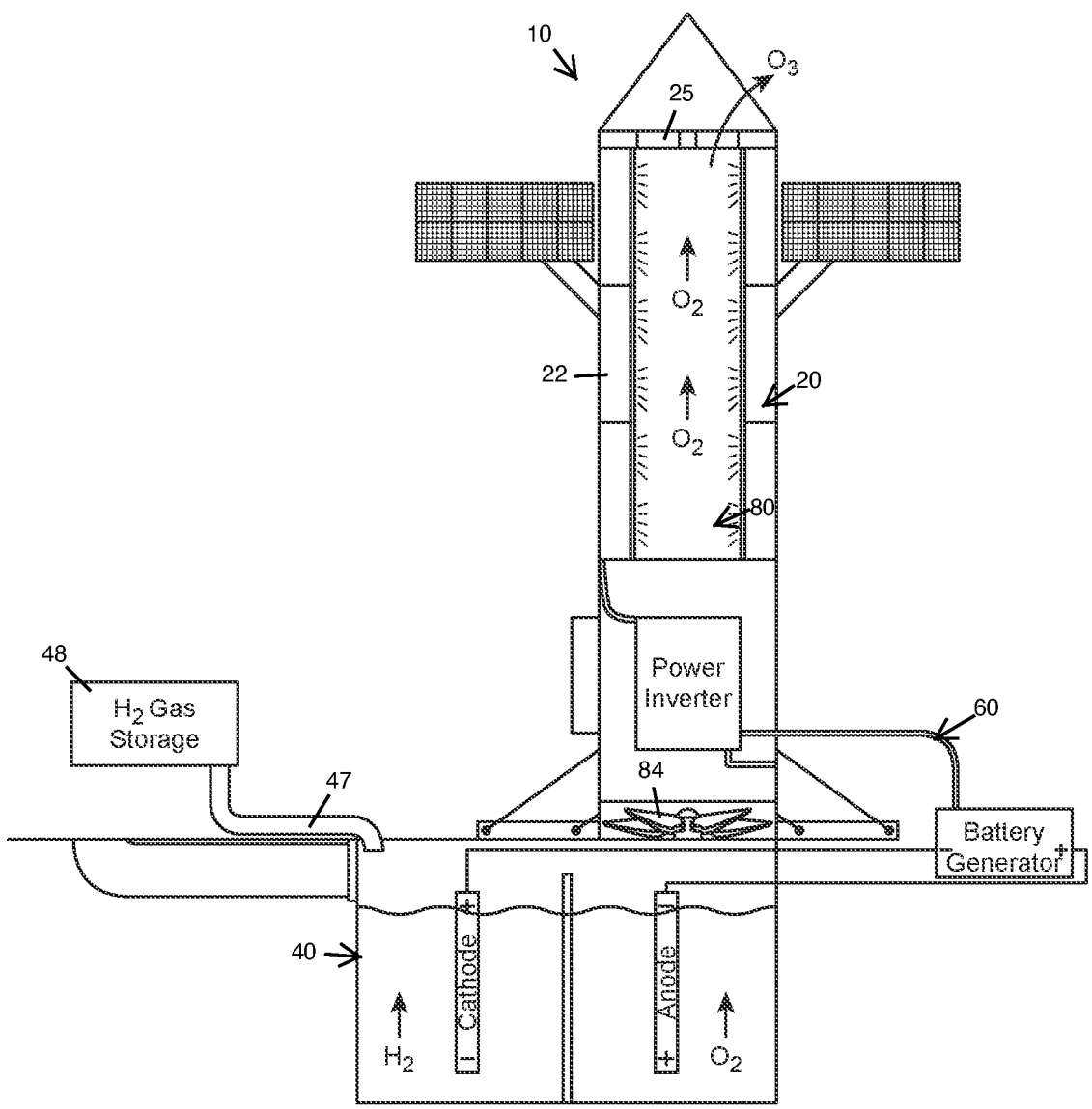

With the above and other related objects in view, the invention consists in the details of construction and combination of parts as will be more fully understood from the following description, when read in conjunction with the accompanying drawings in which:

FIG. 1 represents an isometric operational view of the present invention 10 showing the process of breaking water molecules into hydrogen and oxygen gas. Hydrogen is moved to a container 48 and oxygen upwardly by a fan 84 and passed through a tower 22 where a string of LEDs beam UV light onto the oxygen thereby converting it to ozone and ozone escapes trough ventilation openings 25 to the atmosphere.

Figure 2:
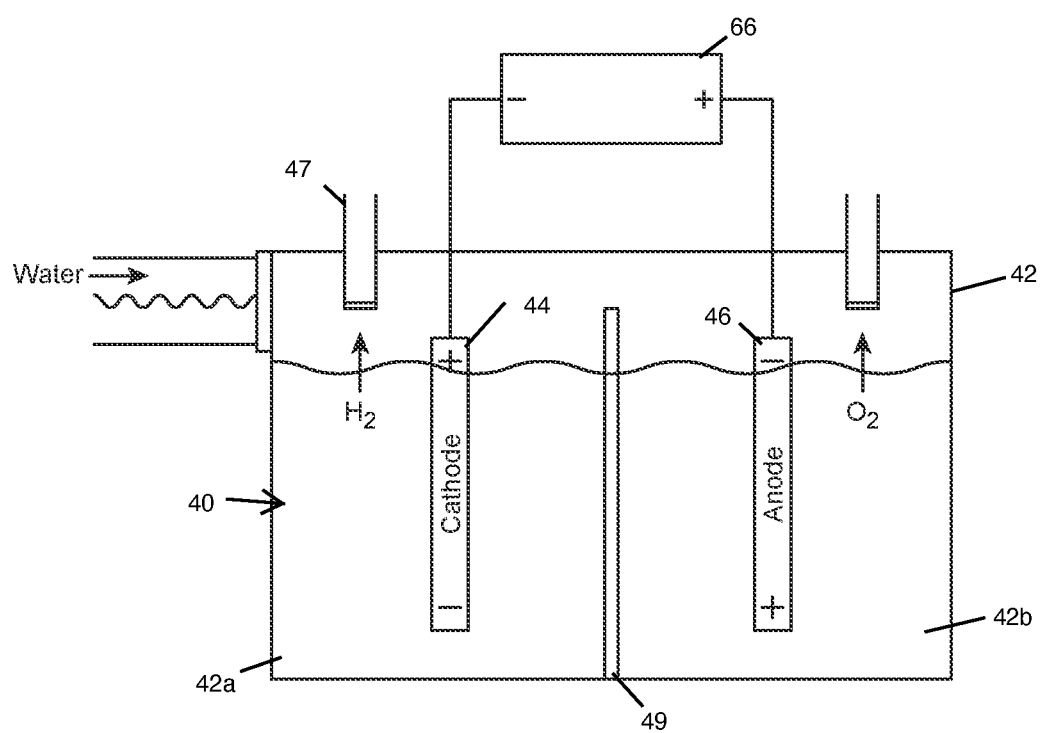

FIG. 2 shows an enlarged view of the electrolysis assembly 40 including a reservoir 42 having a diaphragm 49 in the middle, first electrode 44 at one side of the diaphragm and second electrode 46 at the other side of the diaphragm. And a water filled valve/tube operatively connected to the reservoir 42.

Figure 3:
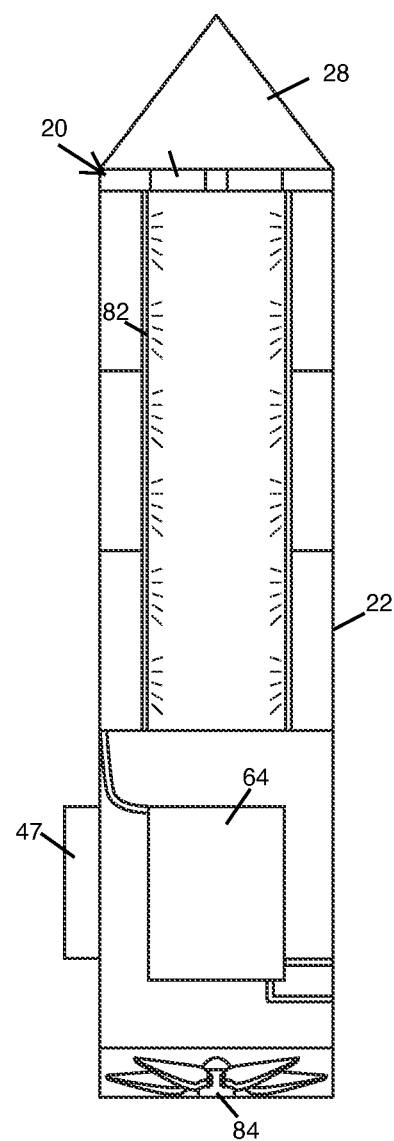

FIG. 3 illustrates and enlarged view of the housing assembly 20 including a tower 22. A protective cover 28 is located on the tower 22 to protect the housing assembly 20 against weather.

Figure 4:
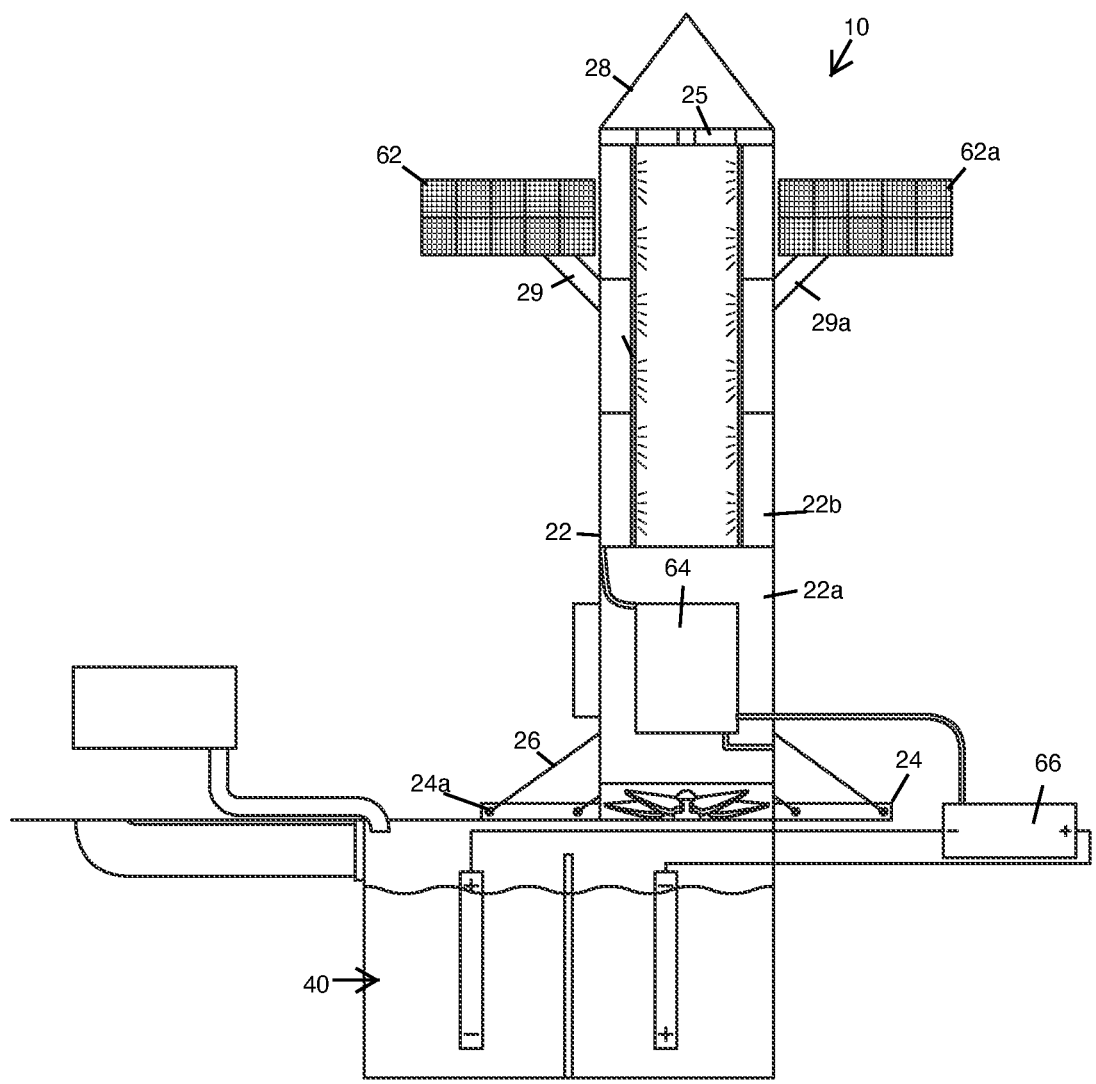

FIG. 4 is a representation of the present invention 10 showing the first solar panel 62 and the second solar panel 62a. A voltage regulator 64 is mounted to an exterior surface of the tower 22 and connected to the battery 66.

V. DETAILED DESCRIPTION OF THE EMBODIMENTS OF THE INVENTION

Referring now to the drawings, where the present invention is generally referred to with numeral 10, it can be observed that it basically includes a housing assembly 20, an electrolysis assembly 40, a power assembly 60 and an ozone assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 includes a tower 22. In one embodiment, the tower 22 may have an elongated cylindrical shape. In different embodiments, the tower may have a cuboid shape, a conic shape, a polygonal shape or the like. The tower 22 may be hollow. The tower 22 may have a bottom portion 22a and a top portion 22b. The bottom portion 22a may have an opening. An upper portion of the top portion 22b may include a protective cover 28. The protective cover 28 may have a conic shape. It should be understood that the protective cover 28 may have any other shape. The protective cover 28 may provide protection to the housing assembly 20 against weather. The tower 22 may include ventilation openings 25. In one embodiment, the ventilation openings 25 may have a rectangular shape. It also may be suitable for the ventilation openings 25 to have a circular, triangular, oval or any other shape. The housing assembly 20 also may include lateral supports 24. The lateral supports 24 may be bars, beams, rods, or the like. The lateral supports 24 may be attached to a lower portion of the tower 22. The lateral supports 24 may be perpendicular to the tower 22. The lateral supports 24 may include a plurality of openings 24a to receive a plurality of cables 26. The plurality of cables 26 may secure the lateral supports 24 to the tower 22. The lateral supports 24 may secure the housing assembly 20 to any surface by bots, rivets or the like.

A first panel support 29 may be attached to a left side of the tower 22. A second panel support 29a may be attached to a right side of the tower 22. The first panel support 29 and the second panel support 29a may also be attached to any other side of the tower 22. It also may be suitable for the housing assembly 20 to have multiple panel supports. The first panel support 29 and the second panel support 29a may have an inclination upwards. The power assembly 60 includes a first solar panel 62 and a second solar panel 62a. The first solar panel 62 may be secured to the first panel support 29 by bolts, rivets, welding, or any other method known in the prior art. The second solar panel 62a may be secured to the second panel support 29a by bolts, rivets, welding or any other method known in the prior art. The first solar panel 62 and the second solar panel 62a may be connected to a voltage regulator 64. The voltage regulator 64 may regulate a voltage of direct current provided by the first solar panel 62 and the second solar panel 62a. The voltage regulator 64 may provide a steady voltage of direct current. The voltage regulator 64 may be mounted to an exterior portion of the lower portion 22a of the tower 22. The voltage regulator 64 may be connected to a battery 66. The battery may provide the voltage of direct current to the electrolysis assembly 40.

Best observed in FIG. 2, The electrolysis assembly includes a reservoir 42, an anode 44 and a cathode 46. The reservoir 42 may contain water. In one embodiment, 1 mol of sulfuric acid ($H_2SO_4$) may be used as electrolyte combined with water contained in the reservoir 42. In another embodiment, 1-3 mol of sodium hydroxide (NaOH) may be used as electrolyte combined with the water contained in the reservoir 42. The reservoir 42 may be divided by a diaphragm 49 defining a left reservoir 42a and a right reservoir 42b. The diaphragm 49 may be located on a middle portion of the reservoir 42. Either sodium hydroxide or sulfuric acid may be the catalyst. Sodium hydroxide or sulfuric acid may increase and assist to ionization. Sodium hydroxide and sulfuric acid may increase purity and effectiveness of the electrolysis. The electrolyte may be heated up to increase the rate of electrolysis. A first electrode 44 and a second electrode 46 may be disposed into the reservoir 42. The first electrode 44 may be disposed into the left reservoir 42a. The second electrode 46 may be disposed into the right reservoir 42b. The first electrode 44 may be a cathode electrode. The second electrode 46 may be an anode electrode. The first electrode 44 and the second electrode 46 may be made of platinum or any other material with low susceptibility to oxidation and corrosion. The first electrode 44 and the second electrode 46 may be connected to the battery 66 or any other electrical power source of direct current. The first electrode 44 may be connected to the negative terminal. The second electrode 46 may be connected to the positive terminal. The first electrode 44 and the second electrode 46 may produce electrolysis of the electrolyte. The electrolysis may produce oxygen $O_2$ and dihydrogen $H_2$. The dihydrogen and the oxygen $O_2$ may be produced on a ratio of 2:1. The dihydrogen $H_2$ may be produced on the left reservoir 42a. The dihydrogen $H_2$ may be captured by a pipe 47. The dihydrogen $H_2$ may be stored in a container 48. The dihydrogen $H_2$ captured may be sold or recycled into the system and used as an additional source of power. The oxygen $O_2$ may be produced on the right reservoir 42b.

The oxygen $O_2$ may be captured by the tower 22 of the housing assembly 20. A fan 84 of the ozone assembly 80 may be attached to the lower portion 22a of the tower 22. The fan 84 may be powered by the battery 66 or any other electrical power source. The fan 84 may allow the oxygen $O_2$ to cross along the entire tower 22. A plurality of lights 82 may be disposed on an interior side of the upper portion 22b of the tower 22. The plurality of lights 82 may be ultraviolet lights. The plurality of lights 82 may convert the oxygen $O_2$ ozone $O_3$. The ozone $O_3$ may be expelled out of the ventilation openings 25 into the atmosphere.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An ozone replenish system, comprising:
   a) a housing assembly including a tower, wherein said tower is hollow;
   b) a power assembly including a battery and a plurality of solar panels wherein said plurality of solar panels are connected to a voltage regulator, wherein said voltage regulator is connected to the battery, wherein said plurality of solar panels are attached to a plurality of panel supports wherein said plurality of panel supports are attached to an external side of the tower;
   c) an electrolysis assembly including a reservoir, a cathode electrode, and an anode electrode, wherein said reservoir is filled with an electrolyte, said electrolyte is sulfuric acid $H_2SO_4$ combined with water $H_2O$ or sodium hydroxide NaOH combined with water $H_2O$ wherein said cathode electrode and said anode electrode are disposed into said reservoir, wherein said cathode electrode, and said anode electrode are connected to the battery, wherein said electrolysis assembly produces oxygen $O_2$ and dihydrogen $H_2$; and
   d) an ozone assembly including a plurality of ultraviolet lights and a fan, wherein said plurality of ultraviolet lights convert the oxygen $O_2$ provided by the electrolysis assembly into ozone $O_3$, wherein said fan is attached to a lower portion of the tower, wherein said fan allows the oxygen $O_2$ to cross along the tower.

2. The ozone replenish system of claim 1, wherein said anode electrode and said cathode electrode are made of platinum.

3. The ozone replenish system of claim 1, wherein said housing assembly includes lateral supports connected to the tower via cables, wherein said lateral supports secure the tower to a surface.

4. The ozone replenish system of claim 1, wherein said housing assembly includes ventilation openings on an upper portion, wherein the ozone $O_3$ is expelled out of the ventilation openings into the atmosphere.

5. The ozone replenish system of claim 1, wherein said housing assembly includes a protective cover located on an upper portion of the tower to protect said tower.

6. An ozone replenish system, comprising:
   a) a housing assembly including a tower, lateral supports, and ventilation openings, wherein said tower is hollow, said ventilation openings are located on an upper portion of the tower, wherein said lateral supports extend outwards from a bottom portion of said tower, said lateral supports are perpendicular to said bottom portion of said tower, wherein each of said lateral supports include a lateral distal end and a proximal end, wherein the lateral distal end of each lateral support is diagonally connected to a bottom-middle portion of said tower by means of cables providing structural support thereto;
   b) a power assembly including a plurality of solar panels and a battery, wherein said plurality of solar panels are connected to a voltage regulator wherein said voltage regulator is connected to the battery, wherein said plurality of solar panels are attached to a plurality of panel supports wherein said plurality of panel supports are attached to an external side of the tower, wherein said plurality of panel supports extend diagonally upwards from said tower, to said plurality of solar panels, wherein said plurality of solar panels produce electrical energy, wherein said battery stores the electrical energy provided by the plurality of solar panels;

c) an electrolysis assembly including a reservoir, a cathode electrode, and an anode electrode, wherein said anode electrode and said cathode electrode are made of platinum, wherein said reservoir is filled with an electrolyte, said electrolyte is sulfuric acid $H_2SO_4$ combined with water $H_2O$ or sodium hydroxide NaOH combined with water $H_2O$ the cathode electrode and the anode electrode are connected to the battery, wherein said electrolysis assembly produces oxygen $O_2$ and dihydrogen $H_2$, wherein said dihydrogen $H_2$ is stored in a container wherein said container has a pipe said pipe is introduced into said reservoir above said electrolyte to collect said dihydrogen $H_2$, wherein said container is placed in a higher position than a position of said reservoir; and d) an ozone assembly including a plurality of ultraviolet lights and a fan, wherein said fan allows the oxygen $O_2$ to cross upwardly along the tower, wherein said plurality of ultraviolet lights convert the oxygen $O_2$ provided by the electrolysis assembly into ozone $O_3$, wherein said ozone $O_3$ is expelled to the atmosphere via the ventilation openings.

7. An ozone replenish system, consisting of:

a) a housing assembly including a tower, lateral supports, a protective cover and ventilation openings, wherein said tower has an elongated cylindrical shape, said tower is hollow, said ventilation openings having a rectangular shape, said ventilation openings are located on an upper portion of the tower between a top end of end of said tower and a bottom end of said protective cover, said protective cover having a conical shape, said protective cover being attached to the upper portion of the tower to protect said housing assembly, wherein said lateral supports extend outwards from a bottom portion of said tower, said lateral supports are perpendicular to said bottom portion of said tower, wherein each of said lateral supports include a lateral distal end and a proximal end, wherein the lateral distal end of each lateral support is diagonally connected to a bottom-middle portion of said tower by means of cables providing structural support thereto, said lateral supports secure the housing assembly to a surface;

b) a power assembly including a plurality of solar panels attached to the housing assembly, wherein said plurality of solar panels produce electrical energy, said electrical energy is regulated by a voltage regulator, said voltage regulator is located on a lower portion of the tower, said voltage regulator is connected to a battery, wherein the battery stores the electrical energy provided by said plurality of solar panels, wherein said plurality of solar panels are attached to a plurality of panel supports, wherein said plurality of panel supports are attached to an external side of the tower wherein said plurality of panel supports extend diagonally upwards from said tower to said plurality of solar panels;

c) an electrolysis assembly including a reservoir, a cathode electrode, and an anode electrode, wherein said reservoir is partially filled with an electrolyte, wherein the electrolyte is sodium hydroxide NaOH combined with water $H_2O$, wherein said cathode electrode, and said anode electrode are made of platinum, wherein the cathode electrode, and the anode electrode are connected to the battery, wherein said electrolysis assembly produces oxygen $O_2$ and dihydrogen $H_2$, wherein said dihydrogen $H_2$ is absorbed by a tube to connected to a container, wherein said container has a pipe, said pipe is introduced into said reservoir above said electrolyte to collect said dihydrogen $H_2$, wherein said container is placed in a higher position than a position of said reservoir; and d) an ozone assembly including a plurality of ultraviolet lights and a fan, wherein said fan allows the oxygen $O_2$ to cross upwardly along the tower, wherein said plurality of ultraviolet lights convert the oxygen $O_2$ provided by the electrolysis assembly into ozone $O_3$, wherein said ozone $O_3$ is expelled to the atmosphere via the ventilation openings.

\* \* \* \* \*